US008907615B2

(12) United States Patent
Mills-Price et al.

(10) Patent No.: US 8,907,615 B2
(45) Date of Patent: Dec. 9, 2014

(54) SYSTEMS AND METHODS FOR DYNAMIC POWER COMPENSATION, SUCH AS DYNAMIC POWER COMPENSATION USING SYNCHROPHASORS

(75) Inventors: Michael A. Mills-Price, Bend, OR (US); Michael Ropp, Brookings, SD (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 447 days.

(21) Appl. No.: 13/160,970

(22) Filed: Jun. 15, 2011

(65) Prior Publication Data

US 2011/0316480 A1   Dec. 29, 2011

Related U.S. Application Data

(60) Provisional application No. 61/355,119, filed on Jun. 15, 2010, provisional application No. 61/363,632, filed on Jul. 12, 2010.

(51) Int. Cl.
| | |
|---|---|
| *H01M 10/44* | (2006.01) |
| *G06F 1/26* | (2006.01) |
| *G05F 1/70* | (2006.01) |
| *H02M 7/44* | (2006.01) |
| *H02J 7/00* | (2006.01) |
| *H02J 3/18* | (2006.01) |
| *H02J 3/38* | (2006.01) |

(52) U.S. Cl.
CPC ............... *H02J 3/1821* (2013.01); *Y02E 40/30* (2013.01); *H02J 3/383* (2013.01); *Y02E 10/563* (2013.01)
USPC ............. 320/101; 323/205; 393/95; 700/297; 320/109

(58) Field of Classification Search
USPC ................................... 320/101, 109; 136/244
See application file for complete search history.

(56) References Cited

U.S. PATENT DOCUMENTS

| | | | | |
|---|---|---|---|---|
| 6,339,538 | B1* | 1/2002 | Handleman | 363/95 |
| 7,193,872 | B2* | 3/2007 | Siri | 363/95 |
| 7,433,215 | B2* | 10/2008 | Taylor et al. | 363/95 |
| 7,508,173 | B2 | 3/2009 | Zhou et al. | |
| 2006/0250024 | A1* | 11/2006 | Taylor | 307/64 |
| 2009/0200988 | A1 | 8/2009 | Bridges et al. | |
| 2009/0276173 | A1 | 11/2009 | Wang et al. | |
| 2009/0283130 | A1* | 11/2009 | Gilmore et al. | 136/244 |

(Continued)

OTHER PUBLICATIONS

Real-World Synchrophasor Solutions, pp. 535-545, Edmund O. Schweitzer, IEEE Mar. 30-Apr. 2, 2009.*

(Continued)

*Primary Examiner* — M'Baye Diao
(74) *Attorney, Agent, or Firm* — Perkins Coie LLP

(57) ABSTRACT

An electrical power generation system, such as a solar power inverter, can provide dynamic real-time power compensation, so as to mitigate the effects of voltage sags and swells (e.g., on a utility grid) and thereby provide voltage support functionality to a local grid. The electrical power generation system can do so by receiving first synchrophasor measurements that are taken at a point on the utility grid and transmitted to the electrical power generation system and by taking second synchrophasor measurements. The first and second synchrophasors indicate voltage magnitude and frequency of the alternating current (AC) at their respective measurement points. The electrical power generation system can compare the first synchrophasors with the second synchrophasors and based upon the comparison, vary the power factor of the power the electrical power generation system generates (e.g., by either supplying or absorbing reactive power).

11 Claims, 6 Drawing Sheets

(56) References Cited

U.S. PATENT DOCUMENTS

2009/0293932 A1* 12/2009 Augenbraun et al. ........ 136/244
2010/0067271 A1 3/2010 Garces et al.
2010/0076613 A1 3/2010 Imes

OTHER PUBLICATIONS

International Search Report and Written Opinion, International Application No. PCT/US2011/040504, Mailed on Oct. 6, 2011, 10 pages.

* cited by examiner ions # US 8,907,615 B2

SYSTEMS AND METHODS FOR DYNAMIC POWER COMPENSATION, SUCH AS DYNAMIC POWER COMPENSATION USING SYNCHROPHASORS

CROSS-REFERENCE TO RELATED APPLICATIONS

This application claims the benefit of U.S. Provisional Patent Application Nos. 61/355,119 filed Jun. 15, 2010, and 61/363,632 filed Jul. 12, 2010, each of which is incorporated herein by reference in its entirety, and is related to the following concurrently filed patent applications: U.S. Pat. App. No. 61/363,634 (entitled SYSTEMS AND METHODS FOR ISLANDING DETECTION; U.S. patent application Ser. No. 13/103,721 (entitled SYSTEMS AND METHODS FOR ISLANDING DETECTION, and U.S. Pat. App. No. 61/363,643 (entitled SYSTEMS AND METHODS FOR ELECTRICAL POWER GRID MONITORING USING LOOSELY SYNCHRONIZED PHASORS, each of which is also incorporated herein by reference in its entirety.

TECHNICAL FIELD

This application is generally directed toward power generation systems.

BACKGROUND

Voltage sags and swells can occur on utility grids and local grids. A voltage sag is a short duration decrease in voltage (e.g., root mean square (RMS) voltage). Common causes of voltage sags are motors starting, customer load additions, and large load additions in a utility service area. For example, an inductive load such as a transformer or motor can cause large sags in grid voltage when starting. A voltage swell is a short duration increase in voltage values. A voltage swell can be caused by removing a large load or by switching in a capacitor bank that is too large for the prevailing conditions.

Such voltage sags and swells can be accompanied by reactive power flow. For example, inductive loads such as transformers and motors absorb reactive power, and capacitive loads such as capacitor banks or long cables generate reactive power. However, local grids may not have the ability to compensate for such reactive power flow in a real-time fashion.

DETAILED DESCRIPTION

1. Overview

Figure 1:
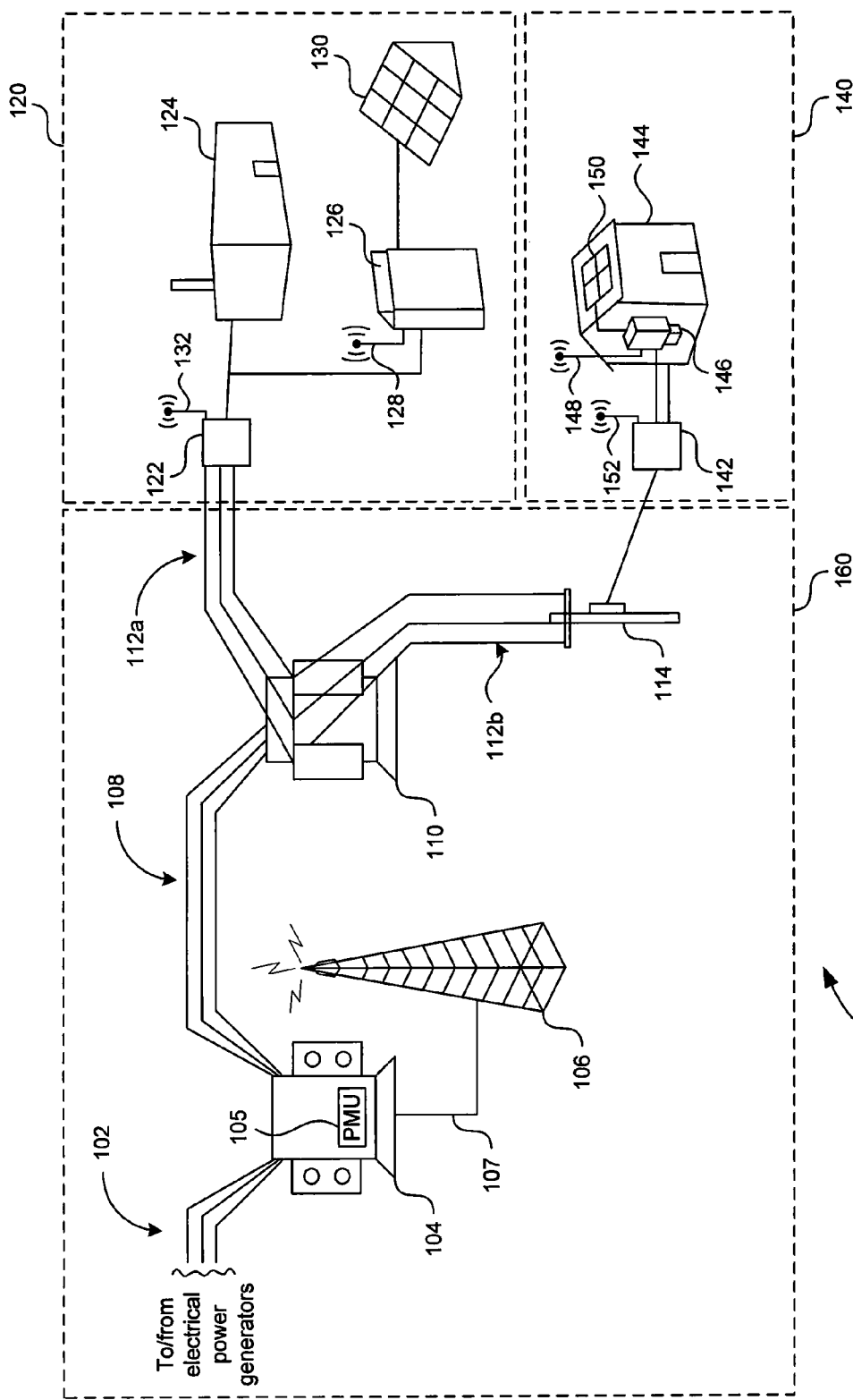
FIG. 1 is a diagram illustrating a system for dynamic power compensation configured in accordance with an embodiment of the technology.

The inventors have recognized that the need exists for systems and methods that overcome the above drawbacks, as well as provide additional benefits. The present disclosure describes systems and methods for dynamic power compensation. An electrical power generation system coupled to a utility grid and to a local grid, such as a solar power inverter, can provide dynamic power compensation so as to mitigate the effects of voltage sags and swells (e.g., on the utility grid) and thereby provide voltage support functionality (e.g., maintain voltage provided to the local grid within a predetermined range). The electrical power generation system can do so by receiving first synchrophasor measurements that are taken at a point on the utility grid and transmitted to the electrical power generation system, and receiving second synchrophasor measurements that are taken at a point electrically proximate to the electrical power generation system. The first and second synchrophasors indicate voltage magnitude and frequency of the alternating current (AC) at their respective measurement points. The electrical power generation system can compare the first synchrophasors with the second synchrophasors, and based upon the comparison the electrical power generation system can vary the power factor of the power generated by the electrical power generation system (e.g., by either supplying or absorbing reactive power).

Certain details are set forth in the following description and in FIGS. 1-6 to provide a thorough understanding of various embodiments of the technology. Other details describing well-known aspects of solar power inverters, however, are not set forth in the following disclosure so as to avoid unnecessarily obscuring the description of the various embodiments.

Many of the details, dimensions, angles and other features shown in the Figures are merely illustrative of particular embodiments. Accordingly, other embodiments can have other details, dimensions, angles and features. In addition, further embodiments can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 100 is first introduced and discussed with reference to FIG. 1.

In one embodiment, a solar power inverter includes a direct current (DC) input component configured to receive DC produced by one or more photovoltaic cells, a power generation component configured to generate alternating current (AC) from the DC, and an AC output component configured to output generated AC. The AC output component is electrically coupleable to an electrical power grid and/or to a load. The solar power inverter further includes a data input/output component configured to receive signals indicating electrical power grid synchrophasors that describe characteristics of AC transmitted by the electrical power grid. The solar power inverter can also include a phasor measurement unit configured to generate inverter synchrophasors. The inverter synchrophasors describe characteristics of the generated AC or of AC at a point that is electrically proximate to the solar power inverter (e.g., at the point of common coupling to the electrical power grid). The solar power inverter further includes a controller configured to compare the electrical power grid synchrophasors and the inverter synchrophasors, and based upon the comparison the controller can be configured to cause the power generation component to vary a reactive power component of the generated AC.

In another embodiment, a power generation apparatus is electrically coupleable to an electric power grid transmitting AC and/or to a load. The power generation apparatus includes a power generation component configured to generate AC and a controller configured to receive first synchrophasor measurements of the AC transmitted by the electrical power grid, receive second synchrophasor measurements of AC at a location electrically proximate to the power generation apparatus, compare the first synchrophasor measurements with the second synchrophasor measurements, and based upon the comparison transmit a signal to the power generation component to vary a reactive power component of the generated AC.

In another embodiment, a power generation system electrically coupleable to an electric power grid transmitting AC or to a load includes means for generating AC usable by at least one of the electric power grid and the load. The generated AC has a real power component and a reactive power component. The power generation system further includes means for varying reactive power of the generated AC using first synchrophasors derived from AC transmitted by the electric power grid and second synchrophasors derived from AC at a location electrically proximate to the power generation system.

In a further embodiment, a method of operating a power generation system electrically coupled to an electric power grid transmitting power and to a load includes receiving a first set of one or more synchrophasors describing characteristics of the power transmitted by the electric power grid and receiving a second set of one or more synchrophasors describing characteristics of power electrically proximate to the load. The load utilizes power having a voltage within a predetermined range. The method further includes comparing the first and second sets of one or more synchrophasors, and based upon the comparison varying the power generated by the power generation system to maintain the voltage of the power utilized by the load within the predetermined range.

2. Systems and Methods for Dynamic Power Compensation

FIG. 1 is a diagram illustrating a system 100 for dynamic power compensation configured in accordance with an embodiment of the technology. The system 100 includes a utility grid portion 160 and multiple customer premises portions 120 and 140. The utility grid portion 160 includes electrical power transmission lines 102 electrically connected to a transmission substation 104. The electrical power transmission lines carry three phase alternating current (AC) generated by one or more electrical power generators. The transmission substation 104 steps down the voltage of the AC (e.g., from 345 kilo Volts (kV) to 69 kV, or from any particular voltage to a lower voltage) before transmission of the AC over electrical power transmission lines 108 to a distribution substation 110. The distribution substation 110 further steps down the voltage of the AC (e.g., to 13.8 kV, or to any other voltage) prior to transmission over electrical transmission lines 112a to a first customer premises portion 120 and over electrical transmission lines 112b to a distribution device 114 and then to a second customer premises portion 140.

The transmission substation 104 includes a phasor measurement unit (PMU) 105. The PMU 105 measures characteristics of the AC at the transmission substation 104 and generates synchrophasors based on the measured characteristics of the AC. The PMU 105 includes a Global Positioning System (GPS) antenna that allows the PMU 105 to accurately timestamp the generated synchrophasors. The transmission substation 104 is networked via a communication channel 107 to a transceiver 106. The transceiver 106 receives the synchrophasors from the PMU 105 via the communication channel 107 and transmits the synchrophasors.

The first customer premises portion 120 includes an industrial load 124, one or more arrays 130 of photovoltaic cells, and an inverter 126. The arrays 130 produce direct current (DC) from solar irradiance and provide the DC to the inverter 126. The inverter 126 converts the DC into AC usable by the industrial load 124 or the utility grid. The inverter 126 is connected to a transceiver 128. As described in more detail herein, the transceiver 128 receives synchrophasors transmitted from the transceiver 106. The first customer premises portion 120 can also includes a switch 122 at the border between the electrical power grid portion 160 and the first customer premises portion 120. The switch 122 includes a transceiver 132. The switch 122 can receive, via the transceiver 132, information transmitted by the transceiver 106 and/or the transceiver 128.

The second customer premises portion 140 includes a residential load 144, an array 150 of photovoltaic cells, and an inverter 146. The array 150 produces DC and provides the DC to the inverter 146, which converts the DC into AC usable by the residential load 144 or the utility grid. The inverter 146 is communicably coupled to a transceiver 148. As described in more detail herein, the transceiver 148 receives synchrophasors broadcast from the transceiver 106. The second customer premises portion 140 can also includes a switch 142 at the border between the electrical power grid portion 160 and the second customer premises portion 140. The switch 142 includes a transceiver 152. The switch 142 can receive, via the transceiver 152, information transmitted by the transceiver 106 and/or the transceiver 148.

As illustrated in FIG. 1 the transceivers 106/128/132/148/152 are shown as wireless transmission and reception devices that transmit and receive information wirelessly. However, the transceivers 106/128/132/148/152 can be any suitable device for transmitting and receiving information over any suitable communication channel (e.g., a wireless network such as WiFi, WiMax, a cellular/GSM network, ZigBee, Advanced Metering Infrastructure (AMI), etc., a wired network such as a fiber network, an Ethernet network, etc., or any combination of wired and wireless networks). Accordingly, the techniques described herein are usable in conjunction with any suitable communication channel.

The system 100 can also include other components coupled to the utility grid portion 160 that are not specifically illustrated. Such components can include other loads (e.g., inductive loads such as a transformer or motor), other electrical components (e.g., capacitor banks), other types of electrical power generation systems (e.g., wind power generation systems and/or other renewable power generation systems), and other components. Activity of loads or other components on the utility grid can cause voltage sags or swells and can be accompanied by reactive power flow, thereby resulting in less than ideal power to the load 124/144, such as voltage that falls outside of a predetermined range that the load 124/144 utilizes, (e.g., ideally utilizes). Such out-of-range voltage can damage the load 124/144 and/or cause the load 124/144 to work harder, therefore becoming less efficient.

As described in more detail herein, the inverter 126/146 can use synchrophasor measurements to dynamically compensate for such voltage sags or swells by adjusting the power factor of the power produced by the inverter 126/146 in a real-time fashion. Such dynamic and real-time compensation by the inverter 126/146 can provide voltage support or voltage stability functionality so as to compensate for the less than ideal power provided to the load 124/144 by the utility grid. (Voltage support or voltage stability may alternatively be referred to herein as grid support or grid stability.)

Figure 2:
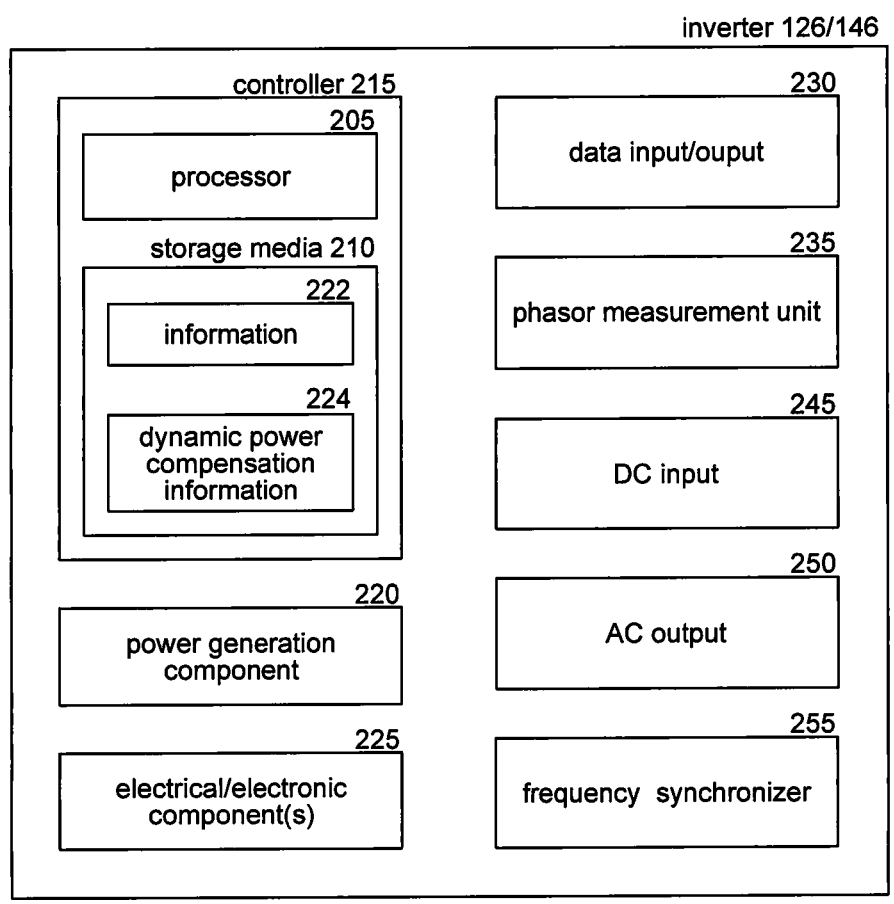
FIG. 2 is a block diagram illustrating components of a solar power inverter configured in accordance with an embodiment of the technology.

FIG. 2 is a block diagram illustrating components of the solar power inverter 126/146 configured in accordance with an embodiment of the technology. The solar power inverter 126/146 can also include components that are not illustrated in FIG. 2. The solar power inverter 126/146 includes a DC input component 245 that receives DC produced by the arrays 130/150. The solar power inverter 126/146 also includes power generation component 220, such as insulating gate bipolar transistors (IGBTs), which transforms DC into AC for output by an AC output component 250. The AC generated by the power generation component 220 has a real power component and a reactive power component. The solar power inverter 126/146 further includes various other electrical and/or electronic components 225, such as circuit boards, capacitors, transformers, inductors, electrical connectors, and/or other components that perform and/or enable performance of various functions associated with the conversion of DC into AC and/or other functions described herein. The solar power inverter 126/146 also includes a data input/output component 230, which can include the transceiver 128/148 and/or other components that provide data input/output functionality and/or connection to a wired or wireless network (e.g., a modem, an Ethernet network card, Gigabit Ethernet network card, etc.).

The solar power inverter 126/146 further includes a frequency synchronizing component 255 that synchronizes a frequency of the AC produced by the power generation component 220 to a frequency of the electrical power grid. For example, the frequency synchronizing component 255 can synchronize to the electrical power grid using a phase-locked loop (PLL). The solar power inverter 126/146 further includes a PMU 235 that measures characteristics of the AC produced by the power generation component 220 and generates synchrophasors based on the measured characteristics. The PMU 235 includes a GPS antenna that allows the PMU to accurately timestamp the synchrophasors.

In some embodiments, the solar power inverter 126/146 receives AC from the electrical power grid (for example, via the AC output component) that is used to power the solar power inverter 126/146. In such embodiments, the PMU 235 can measure the characteristics of the received AC even if the inverter 126/146 is not generating AC. In some embodiments, the PMU 235 is external to the solar power inverter 126/146. For example, the PMU 235 may be sited at the point of common coupling (PCC) of the solar power inverter 126/146 to the electrical power grid and can measure the characteristics of the AC at such location. A site may have multiple solar power inverters 126/146 with a single PCC and a PMU 235 at the PCC. The PMU 235 can measure the characteristics of the AC at the PCC and transmit the synchrophasors to the multiple solar power inverters 126/146. In such a configuration the solar power inverters 126/146 can independently or collectively provide voltage support or voltage stability functionality using the synchrophasors from the PMU 105 (which may be referred to herein as reference synchrophasors) and synchrophasors from the PMU 235 (which may be referred to herein as local synchrophasors).

The solar power inverter 126/146 further includes a controller 215, which includes a processor 205 and one or more storage media 210. For example, the controller 215 can include a control board having a digital signal processor (DSP) and associated storage media. As another example, the controller 215 can include a computing device (for example, a general purpose computing device) having a central processing unit (CPU) and associated storage media. The storage media 210 can be any available media that can be accessed by the processor 205 and can include both volatile and nonvolatile media, and removable and non-removable media. By way of example, and not limitation, the storage media 210 can include volatile and nonvolatile, removable and non-removable media implemented via a variety of suitable methods or technologies for storage of information. Storage media include, but are not limited to, RAM, ROM, EEPROM, flash memory or other memory technology, or any other medium (for example, magnetic disks) which can be used to store the desired information and which can accessed by the processor 205.

The storage media 210 stores information 222. The information 222 includes instructions, such as program modules, that are capable of being executed by the processor 205. Generally, program modules include routines, programs, objects, algorithms, components, data structures, and so forth, which perform particular tasks or implement particular abstract data types. The information 222 also includes data, such as values stored in memory registers, which can be accessed or otherwise used by the processor 205. The processor 205 can use the information 222 to perform various functions or cause various functions to be performed. The storage medium also stores dynamic power compensation information 224. As described in more detail herein, the processor 205 can use the dynamic power compensation information 224 to, among other things, compare synchrophasor measurements, determine whether or not to vary reactive power, and if so, how to vary reactive power.

Figure 3:
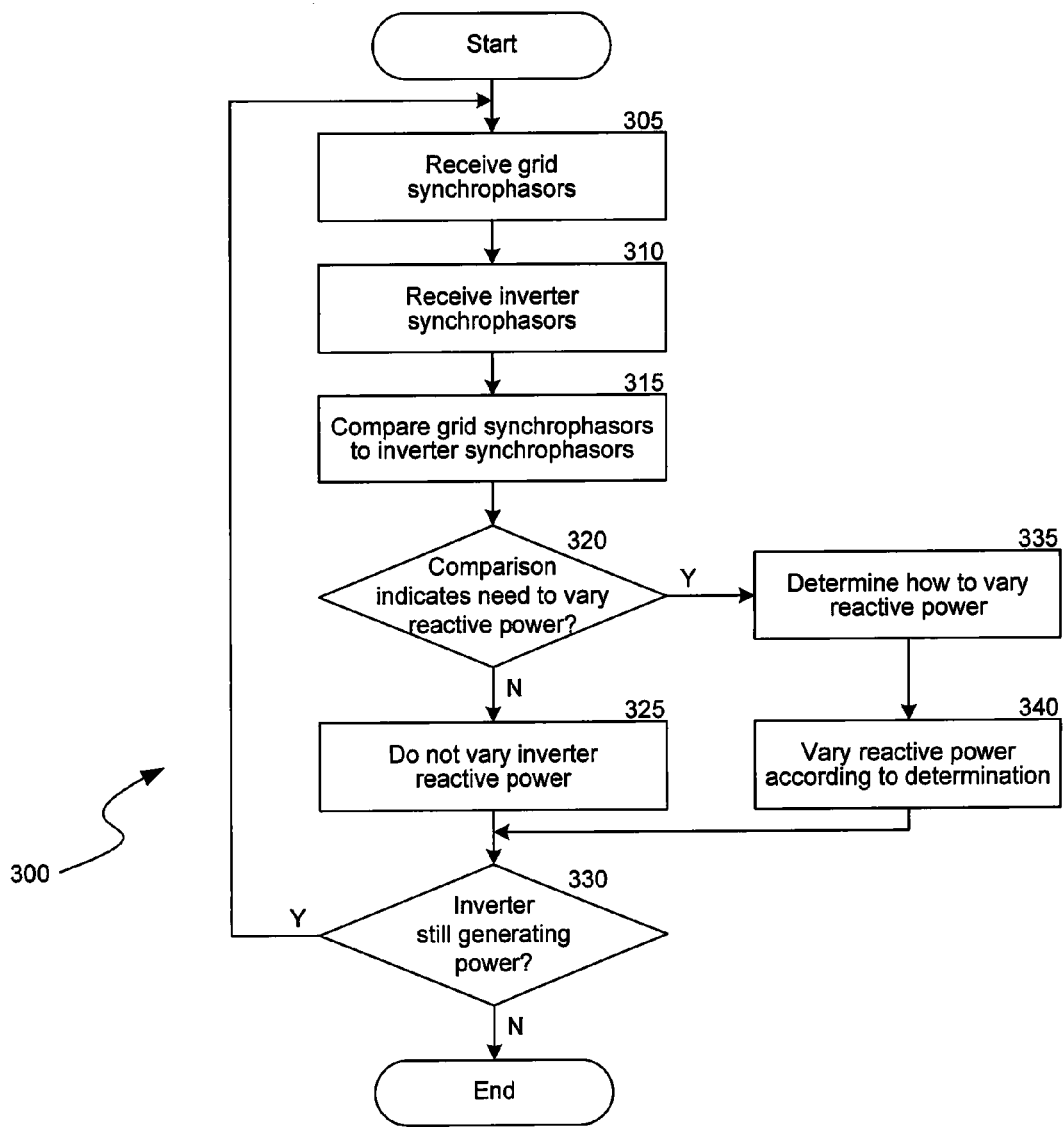
FIG. 3 is a flow diagram of a process for dynamically varying reactive power produced by a solar power inverter in accordance with an embodiment of the technology.

FIG. 3 is a flow diagram of a process 300 for dynamically varying power produced by the inverter 126/146. The controller 215 can perform the process 300 to, among other things, determine whether to vary reactive power produced by the inverter 126/146, and if so, how to vary the reactive power produced by the inverter 126/146. The process 300 is described as performed by the controller 215 of the solar power inverter 126/146. However, any suitable component of the solar power inverter 126/146 can perform the process 300. Additionally or alternatively, any suitable apparatus or system with appropriate hardware (e.g., central processing unit (CPU), etc.), firmware (e.g., logic embedded in microcontrollers, etc.), and/or software (e.g., stored in volatile or nonvolatile memory) can perform the process 300. The controller 215 can perform the process 300 on a periodic or an ad-hoc basis. For example, the controller 215 can perform the process at the same rate at which the controller 215 receives synchrophasors (described below).

The process 300 begins at step 305, where the controller 215 receives synchrophasors received by the data input/output component 230 (e.g., synchrophasors transmitted by the transceiver 106). In FIG. 1, the transmission substation 104 includes the PMU 105 that generates synchrophasors that the transceiver 106 transmits. Additionally or alternatively, other components of the utility grid portion 160 (e.g., the distribution substation 110, the distribution device 114, and/or electrical power generators) can include a PMU that generates synchrophasors that are broadcast (e.g., wirelessly or by another suitable communication channel) to the solar power inverter 126/146. Synchrophasors derived from measurements taken of AC transmitted by the utility grid are referred to herein as grid synchrophasors.

One advantage of wirelessly transmitting and receiving grid synchrophasors is that this can reduce the latency between the transmission and the reception of the grid synchrophasors. However, suitable communication channels other than wireless can be used to transmit and receive grid synchrophasors, such as fiber, Ethernet, and other suitable communication channels. The PMU 105 can measure characteristics of the AC and generate synchrophasors at any suitable sampling rate, such as a sampling rate from approximately 5 Hz or more to approximately 80 Hz (e.g., approximately 5 samples per second to approximately 80 samples per second or more).

At step 310 the controller 215 receives the inverter synchrophasors that are generated by the PMU 235 based on measurements of characteristics of the AC generated by the power generation component 220 or of the AC at another suitable location such as the PCC. The PMU 235 can generate synchrophasors at the same sampling rate as the PMU 105. Synchrophasors derived from measurements taken of AC generated by the power generation component 220 (or at another suitable location such as the PCC) are referred to herein as inverter synchrophasors. As previously noted, the grid synchrophasors generated by the PMU 105 of the transmission substation 104 and the inverter synchrophasors generated by the PMU 235 of the inverter can be GPS timestamped. The timestamping allows the controller 215 to accurately associate a grid synchrophasor having a particular timestamp to an inverter synchrophasor having the same timestamp. At step 315, the controller 315 compares the grid synchrophasors to the inverter synchrophasors.

Figure 4A:
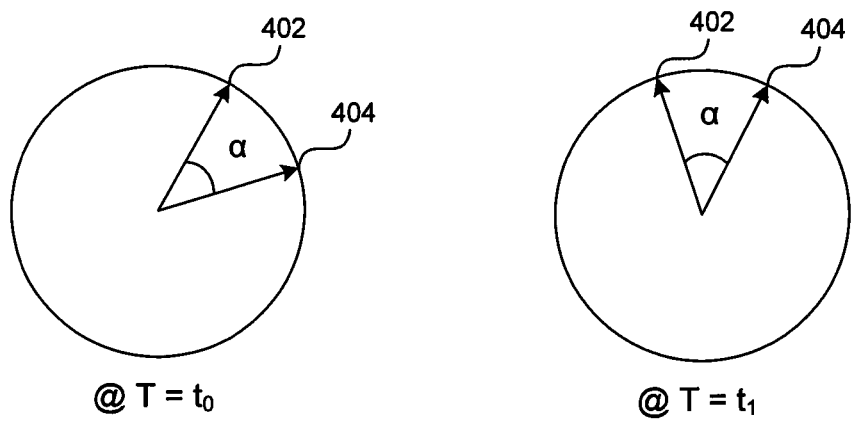
FIGS. 4A and 4B are diagrams illustrating relationships between grid synchrophasors and inverter synchrophasors measured for static and varying loads, respectively.

As known to those of skill in the art, a synchrophasor can indicate a magnitude and a frequency of AC voltage. Under a generally static load, the positive sequence voltage of the inverter AC is generally locked to the positive sequence voltage of the grid AC, both in terms of the speed ($\omega$) as well as the position (constant angle $\alpha$). FIG. 4A illustrates a grid vector 402 and an inverter vector 404 at a time $T=t_0$ and the grid vector 402 and the inverter vector 404 at a time $T=t_1$, where the load remains generally constant between times $t_0$ and $t_1$. The grid vector 402 represents the positive sequence voltage of the grid AC and vector 404 represents the positive sequence voltage of the inverter AC. The vectors 402 and 404 have the generally same speed ($\omega$) and there is an angle ($\alpha$) between their positions that remains the same between times $t_0$ and $t_1$.

Figure 4B:
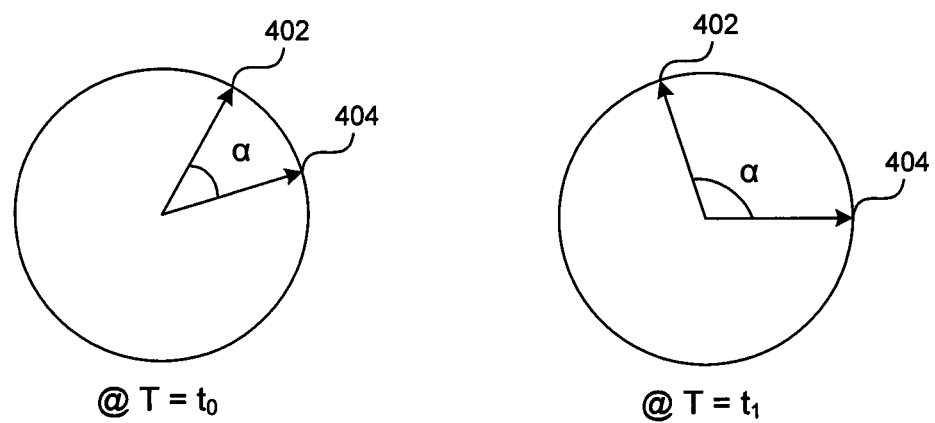

As the load changes, the speed $\omega$ of the vectors 402/404 can remain generally the same, but the angle $\alpha$ dynamically changes. FIG. 4B illustrates the grid vector 402 and the inverter vector 404 at a time $T=t_0$ and the grid vector 402 and the inverter vector 404 at a time $T=t_1$, where the load varies between times $t_0$ and $t_1$. FIG. 4B illustrates that the angle $\alpha$ between the grid vector 402 and the inverter vector 404 is greater at time $T=t_1$ than it was at time $T=t_0$.

Using the grid synchrophasors and the inverter synchrophasors, the controller 215 can determine the angle $\alpha$ according to equation (1):

$$\alpha = V_{grid_{angle}} - V_{inverter_{angle}} \quad (1)$$

The controller 215 can determine a first derivative of angle difference (e.g., slip) according to equation (2):

$$\text{slip} = \frac{\alpha_n - \alpha_{n-1}}{360} \quad (2)$$

The controller 215 can determine a second derivative of angle difference (e.g., acceleration) $\hat{A}$ according to equation (3):

$$\hat{A} = (\text{slip}_n - \text{slip}_{n-1}) \quad (3)$$

Returning to FIG. 3, at step 320 the controller 215 can determine whether the comparison of the grid synchropha-sors and the inverter synchrophasors indicates the need to vary reactive power so as to, for example, provide grid support or grid stability functions. For example, the controller 215 can use the angle $\alpha$ (e.g., whether the angle $\alpha$ falls outside a specific band, such as +/−30°), the second derivative of angle difference $\hat{A}$ value (e.g., whether the second derivative of angle difference $\hat{A}$ exceeds a threshold value), the magnitude of the voltage, any combination of these factors, or any combination of these and other factors, to determine if the reactive power component of the AC generated by the power generation component 220 needs to be varied.

The controller 215 can utilize positive, negative, and zero sequence utility and inverter synchrophasor measurements to detect sags or swells in individual lines. For example, the controller can utilize complex phase voltages (e.g., voltage for each phase of a three-phase AC system) to determine the positive, negative, and zero sequence. The controller 215 can also determine the complex phase voltages using the sequence voltages.

If the controller 215 determines that the reactive power component needs to be varied, the process continues to step 335, where the controller 215 determines how to vary the reactive power component of the AC generated by the inverter 126/146. The controller 215 can use the factors used in step 320 to determine how to vary the reactive power component of the AC and/or other factors. For example, the controller 215 can determine that the power generation component 220 should supply or absorb volt-amperes reactive (vars) and the amount of vars to be supplied or absorbed. At step 340, the controller 215 causes the power generation component 220 to vary the reactive power according to the determination made in step 335. The power generation component 220 can vary reactive power by supplying or absorbing vars. For example, the controller 215 can cause the output current waveform of the AC to be adjusted to supply or absorb vars.

Such varying of reactive power can provide useful voltage support to loads 124/144. Varying the reactive power changes the power factor of the power generated by the power generation component 220. The power factor may be changed in such a way that apparent power consumed by the load 124/144 increases, which may increase costs and/or decrease revenue from power produced by the inverter 126/146. However, such increased costs may be of secondary importance to providing grid support or grid stability functionality to the utility grid, for which the utility grid operator may be willing to compensate the operator of the inverter 126/146. In contrast to such techniques, conventional solar power inverters may strive to produce enough vars that the conventional solar power inverter plus the local load has a power factor of one, so as to minimize costs to the operator of the conventional solar power operator.

In some embodiments, the solar power inverter 126/146 can provide voltage support functionality without receiving DC input or generating AC by the power generation component 220. For example, the solar power inverter 126/146 can transform the waveform of AC received from the utility grid to supply or absorb vars to the utility grid. In so doing, the solar power inverter 126/146 can act as a virtual inductor or capacitor to shift the phase of the AC received from the utility grid. Such capability allows the solar power inverter 126/146 to provide grid support functionality even at times when the solar power inverter 126/146 is not receiving DC input power from the arrays 130/150 (e.g., at night or at other times when the arrays 130/150 are not producing DC power).

After step 340, the process continues to step 330 (described below). If at step 320 the controller 215 determines that the reactive power component does not need to be varied, the process 300 continues to step 325 where the reactive power component is not varied (the power generation component 220 maintains the same amount of reactive power). The process 300 then continues to step 330, where the controller 215 determines whether the solar power inverter 126/146 is still generating power. If so, the process 300 returns to step 305. If not, the process 300 concludes.

Those skilled in the art will appreciate that the steps shown in FIG. 3 or the other illustrated flow diagrams may be altered in a variety of ways. For example, the order of the steps may be rearranged; substeps may be performed in parallel; shown steps may be omitted, or other steps may be included; etc.

One advantage of the techniques described herein is that the inverter 126/146 can utilize measurements of AC at various points on the utility grid to intelligently make decisions on how to provide grid support or grid stability functionality. Another advantage is that the inverter 126/146 can act without the need for instructions from a central control system, such as a supervisory control and data acquisition (SCADA) system. Accordingly, multiple inverters that are distributed about various points on a utility grid can act in a distributed fashion to provide grid support functionality at such points. Such distributed and dynamic grid support functionality can pave the way to higher penetration rates for solar power and/or other renewable power generation systems on the utility grid.

Another advantage is that transmitting grid synchrophasors wirelessly to the inverter 1261/46 obviates any need to provide a physical communication channel to the inverter 126/146. Accordingly, costs of installing and maintaining solar power inverters and other renewable power generation systems can be reduced.

3. Synchrophasor Source Identification

In FIG. 1, the transceiver 106 in the utility grid portion 160 broadcasts synchrophasors, and the transceivers 128/148 in the customer premises portions 120/140 receive the synchrophasors. The utility grid portion 160, the customer premises portions 120/140, as well as other customer premises portions can form a control area. A control area is a logical area for which a utility attempts to balance electrical power supply and demand for electrical power. In some embodiments, each control area includes a single PMU device and a single transceiver that broadcasts synchrophasors generated by the single PMU device.

However, logical control areas may geographically overlap or otherwise be geographically formed in such a way that a solar power inverter transceiver receives wireless synchrophasor broadcasts from a transmission substation transceiver in another control area. In such a case, the inverter can utilize such wireless synchrophasor broadcasts in addition to or as an alternative to using the wireless synchrophasor broadcasts from the transmission substation transceiver in the control area covering the inverter.

In some embodiments, each transmission substation PMU and/or transceiver has an identifier that uniquely identifies it amongst multiple transmission substation PMUs and/or wireless devices. The transmission substation transceiver transmits the identifier with the synchrophasors, and the inverter transceivers receive the identifier with the synchrophasors. In such embodiments, the inverter can use the identifier to select which synchrophasors to use. For example, the inverter can select only the synchrophasors identified as originating from the transmission substation transceiver in the control area covering the inverter.

To protect data security, the synchrophasors and/or identifiers can be encrypted so as to inhibit eavesdropping and/or other unauthorized or unwanted use of such data.

4. Dynamic Energy Management Using Synchrophasors

Electric utilities must provide electrical power in response to varying demand throughout the day. Although much demand for electrical power cannot be shifted to other periods of time in the day, certain demand for electrical power may be able to be moved from one part of the day to another part of the day. For example, an individual may typically charge the individual's electric vehicle after the completion of the individual's commute from home to work or from work to home. As the number of electric vehicles grows, demand for electric power at these times is likely to grow, and may even outpace the ability of electric utilities to supply electrical power at such times. Moreover, the utility grid may experience certain conditions that interrupt or disrupt electrical power transmission during such periods of time, but consumers of electric power may be unaware of such conditions. Accordingly, it would be useful to be able to provide consumers with techniques for ascertaining utility grid conditions, so as to provide consumers with information that they may use to modify or shift their demands for electrical power.

Figure 5:
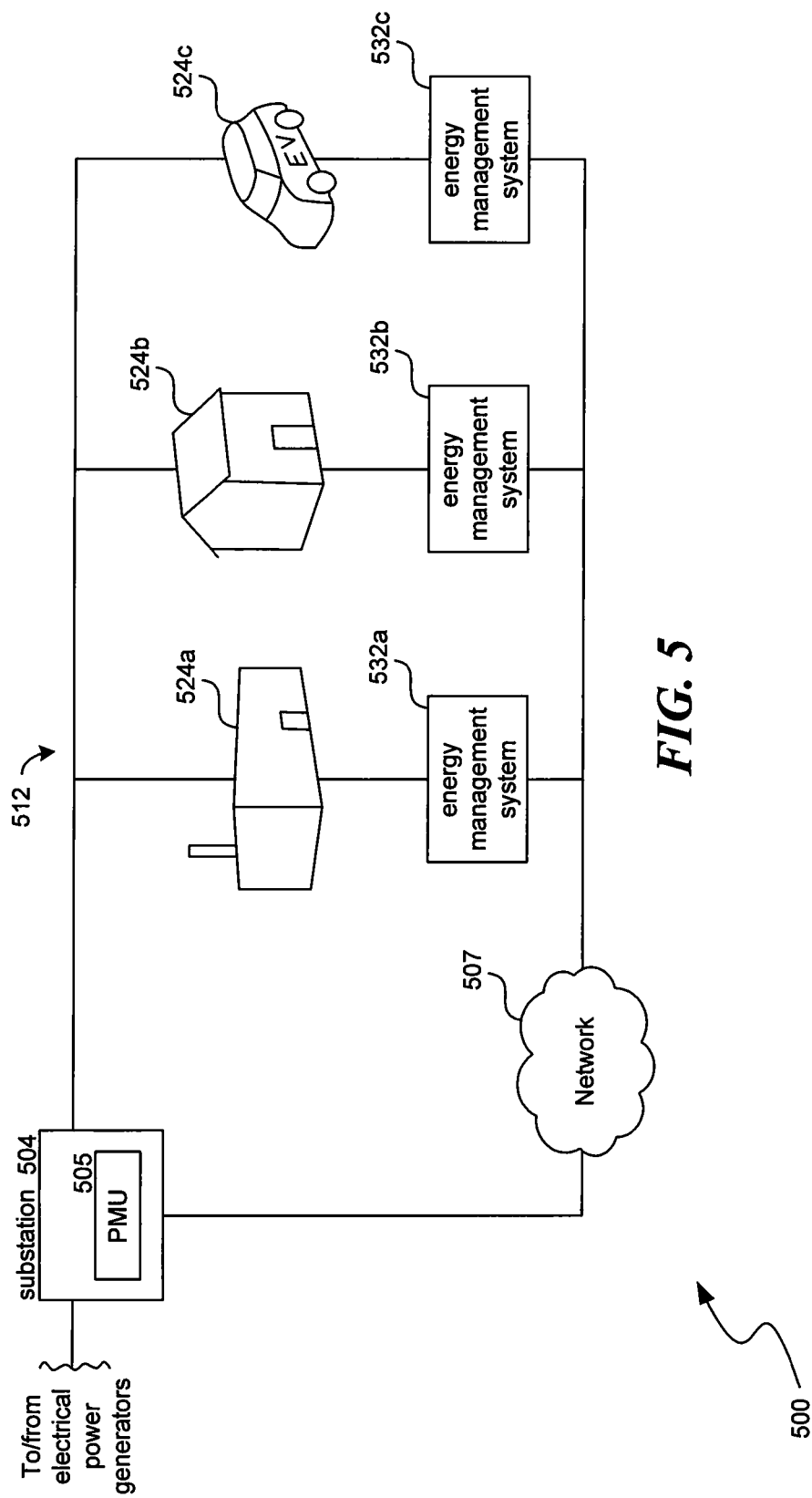
FIG. 5 is a diagram illustrating a system for dynamic energy management configured in accordance with an embodiment of the technology.

FIG. 5 is a diagram illustrating a system 500 for dynamic energy management configured in accordance with an embodiment of the technology. The system 500 includes a substation 504 (e.g., a transmission substation 104, a distribution substation, or any other suitable location on a utility grid) that transmits electrical power generated by electrical power generators over electrical transmission lines 512 to various loads 524 (shown individually as an industrial/commercial load 524a, a residential load 524b, and an electric vehicle load 524c corresponding to an electric vehicle having a rechargeable battery). The substation 504 includes a PMU 505 that measures characteristics of the AC at the substation 504 and generates synchrophasors based on the measured characteristics of the AC.

The substation 504 transmits the synchrophasors over a network 507 (e.g., a wired network, a wireless network, a combination of wired and wireless networks, or any other suitable network) to energy management systems 532 (shown individually as energy management systems 532a-c). Each of the energy management systems 532 manages the demand for electrical power for the corresponding load 524. An energy management system 532 may be wholly separate from the load 524 (e.g., a separate computing device having a central processing unit (CPU) and associated storage media); or an energy management system 532 may be wholly or partially integrated with the load 524 (e.g., wholly or partially integrated with other control systems of the load). For example, energy management system 532c may be completely integrated into electric vehicle load 524c. The substation 504 and the loads 524 may each be part of a single control area, and the energy management systems 532 may act only in response to synchrophasors originating from the PMU 505.

Figure 6:
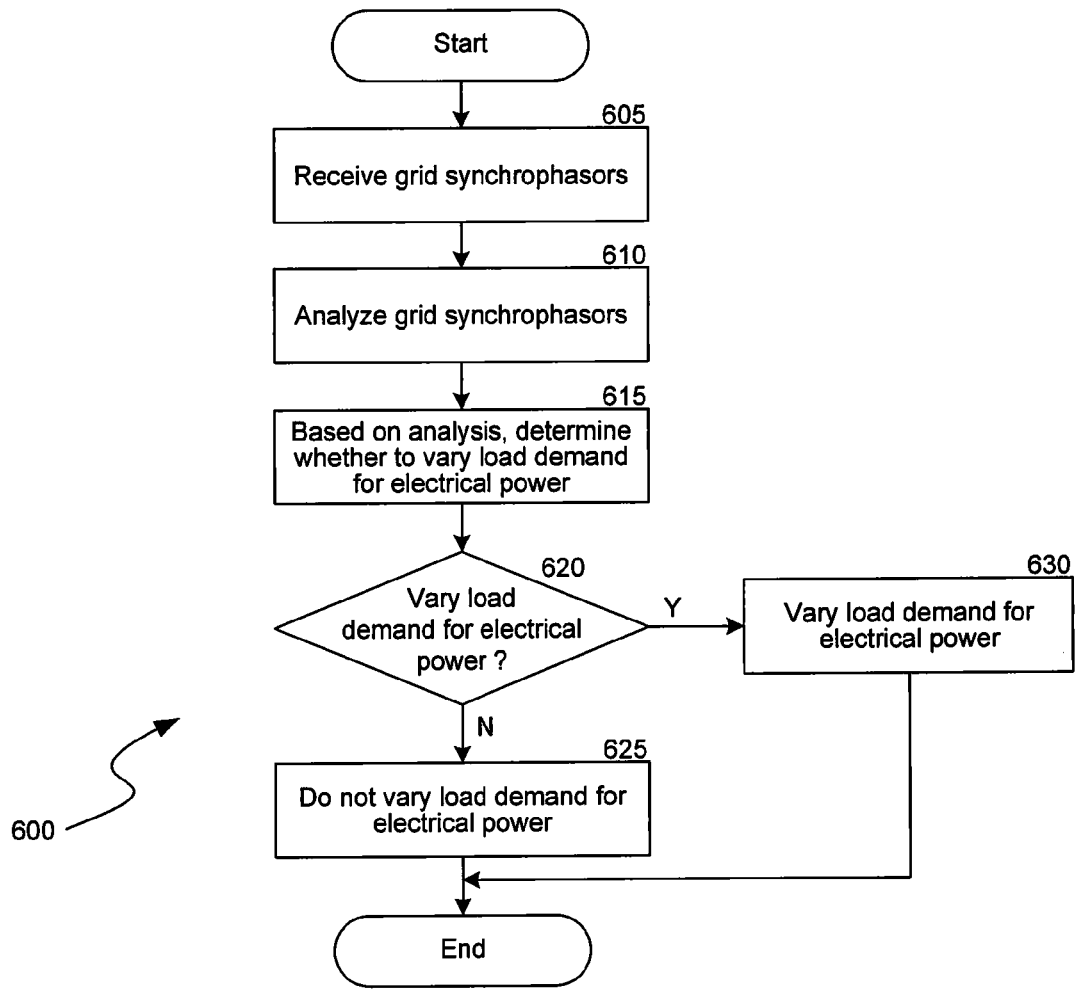
FIG. 6 is a flow diagram of a process for dynamically varying load demand for electrical power in accordance with an embodiment of the technology.

FIG. 6 is a flow diagram of a process 600 for dynamically varying demand for electrical power in accordance with an embodiment of the technology. The process 600 may be performed by an energy management system 532 or any other suitable system. The process 600 begins at step 605 where the energy management system 532 receives grid synchrophasors transmitted from the substation 504 over the network 507. At step 610, the energy management system 532 analyzes the grid synchrophasors. For example, the energy management system 532 may obtain from the grid synchrophasors grid voltage and frequency information and compare the grid voltage and frequency information with reference information to determine if the utility grid is experiencing a disruption, interruption, or other grid condition. Additionally or alternatively, the energy management system 532 may use other techniques to analyze the grid synchrophasors.

At step 615, the energy management system 532 determines based on the analysis whether to vary the load 524 demand for electrical power. For example, the analysis may indicate that the energy management system 532 should vary a loading or charging characteristic of the load 524 (e.g., reduce the load 524 demand for electrical power by a certain percentage, delay the load 524 demand for electrical power, etc.) The energy management system 532 can also determine how to vary the load 524 demand for electrical power based upon the analysis. At decision step 620, if the determination is that the energy management system 532 should vary the load 524 demand for electrical power, the process 600 branches to step 630, where the energy management system 532 adjusts the load 524 demand for electrical power. For example, the energy management system 532 may turn off non-critical portions of the load 524 based upon the determination made in step 615. As another example, the energy management system 532c may adjust characteristics of the charging of the rechargeable battery of load 524c (e.g., reduce the charging rate, delay charging, etc.). If the determination is that the energy management system 532 should not vary the load 524 demand for electrical power, the process 600 branches to step 625, where the energy management system 532 does not vary adjust the load 524 demand for electrical power. After either step 630 or step 625 the process 600 concludes.

An energy management system 532 can perform the process 600 so as to adjust the load 524 demand for electrical power. For example, the energy management system 532c could determine from grid synchrophasors that the utility grid is experiencing a high demand for electrical power. The energy management system 532c could correlate such high demand with rate information and infer that the utility is charging a high price for electrical power. Therefore, the energy management system 532c could delay charging the load 524c until a later time, when the energy management system 532c determines from the grid synchrophasors that the utility grid is experiencing a low demand for power (which may be correlated with lower rates). In some cases, such intelligent energy management may be a selling point for the electrical vehicle 524c (e.g., "this electrical vehicle can lower your electric bill (in comparison with other electrical vehicles)).

5. Additional Embodiments

The control of inverter or generator system real output power (kW) may be modulated or otherwise modified in addition to or in lieu of varying the reactive power (kVAr) using an analogous comparison of synchrophasor information to improve system voltage and frequency stability. The modulation of the inverter or generator system real output power can be independent or in conjunction with the control of reactive power depending on the system configuration and voltage support needs. Such control of the inverter or generator real power output can be configured for both low- and high-X/R ratios (supply reactance to resistance ratio) to be mitigated through distributed voltage support.

From the foregoing, it will be appreciated that specific embodiments of the invention have been described herein for purposes of illustration, but that various modifications may be made without deviating from the spirit and scope of the invention. For example, the elements of one embodiment can be combined with other embodiments in addition to or in lieu of the elements of other embodiments. Accordingly, the invention is not limited except as by the appended claims.

We claim:

1. A solar power inverter, comprising:
   a direct current (DC) input component configured to receive DC produced by one or more photovoltaic cells;
   a power generation component configured to generate alternating current (AC) from the DC produced by the one or more photovoltaic cells, the generated AC having a real power component and a reactive power component;
   an AC output component configured to output generated AC, wherein the AC output component is electrically coupleable to at least one of an electrical power grid and a load;
   a data input/output component configured to receive signals indicating electrical power grid synchrophasors, wherein the electrical power grid synchrophasors describe characteristics of AC transmitted by the electrical power grid at a remotely located substation, and wherein electrical power grid synchrophasors are measured at multiple control areas of the electrical power grid, wherein the solar power inverter is associated with a particular control area, and wherein the controller is further configured to identify the electrical power grid synchrophasors corresponding to the particular control area with which the solar power inverter is associated;
   a phasor measurement unit configured to generate inverter synchrophasors, wherein the inverter synchrophasors describe characteristics of AC electrically proximate to the AC output component; and
   a controller configured to—
      compare the electrical power grid synchrophasors and the inverter synchrophasors; and
      based upon the comparison, cause the power generation component to vary the reactive power component of the generated AC.

2. The solar power inverter of claim 1 wherein the data input/output component is further configured to receive signals indicating inverter synchrophasors.

3. The solar power inverter of claim 1 wherein the controller is further configured to compare voltage and frequency of the electrical power grid synchrophasors with voltage and frequency of the inverter synchrophasors.

4. The solar power inverter of claim 1 wherein the controller is further configured to cause the power generation component to vary the reactive power component of the generated AC by adjusting an output current waveform of the generated AC.

5. The solar power inverter of claim 1, wherein the signals indicating electrical power grid synchrophasors further indicate a control area of the electrical power grid at which the electrical power grid synchrophasors are measured.

6. A power generation apparatus electrically coupleable to at least one of an electric power grid transmitting alternating current (AC) and a load, the power generation apparatus comprising:
   a power generation component configured to generate AC, the generated AC having a reactive power component and a real power component; and
   a controller configured to—
      receive first synchrophasor measurements of the AC transmitted by the electrical power grid at a remotely located substation, wherein synchrophasor measurements are taken at multiple control areas of the electrical power grid, wherein the power generation apparatus is associated with a particular control area, and wherein the controller is further configured to identify a subset of the synchrophasor measurements taken at the particular control area with which the power generation apparatus is associated;

receive second synchrophasor measurements of AC generated at the power generation component;

compare the first synchrophasor measurements with the second synchrophasor measurements; and based upon the comparison, control the power generation component to vary one or both of the real power component and/or the reactive power component of the generated AC.

7. The power generation apparatus of claim 6, further comprising a data input/output component operably coupled to the controller and configured to receive signals indicating the first synchrophasor measurements and provide the first synchrophasor measurements to the controller.

8. The power generation apparatus of claim 6 wherein the controller is further configured to compare voltage and frequency of the first synchrophasor measurements with voltage and frequency of the second synchrophasor measurements.

9. The power generation apparatus of claim 6 wherein the controller is further configured to control the power generation component to vary the reactive power component of the generated AC by adjusting an output current waveform of the generated AC.

10. The power generation apparatus of claim 6, wherein the controller is further configured to receive information identifying control areas of the electrical power grid at which the first synchrophasor measurements are taken.

11. The power generation apparatus of claim 6 wherein the controller is configured to control the power generation component to vary only the reactive power component of the generated AC.

* * * * *